M. T. Boult,
Carving Tool.

No. 112,680.  Patented Mar. 14, 1871.

Witnesses.  Inventor.

UNITED STATES PATENT OFFICE.

MYRON T. BOULT, OF BATTLE CREEK, MICHIGAN.

IMPROVEMENT IN CARVING-TOOLS.

Specification forming part of Letters Patent No. 112,680, dated March 14, 1871.

I, MYRON T. BOULT, of Battle Creek, in the county of Calhoun and State of Michigan, have invented a new and Improved Molding and Carving Tool, of which the following is a specification:

Nature and Objects of my Invention.

My invention relates to a steel tool or cutter formed out of a solid piece of steel, having cutting lips or edges, and a shank to connect it to a chuck, from which it gets its motion, all as hereinafter set forth.

The object of my invention is to groove, mold, and carve upon the surface of lumber.

General Description.

Figure 1:
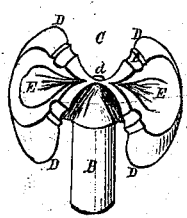
Figures 1 and 2 are perspective views of one of my molding or carving tools embodied in my invention.
Figure 2:
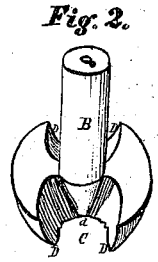
Figure 3:
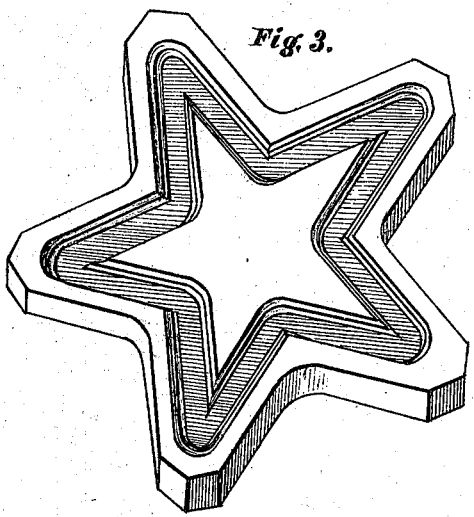
Fig. 3, a view of a piece of the work produced.

Fig. 1 shows one of my molding and carving tools. A is the molding formed on the cutter-edge. B is the shank to connect it to chuck. C is an opening formed by cutting away a portion of the tool from the periphery to the center, forming double counter-faced cutting-edges and openings for the escape of chips. D $d$ show cutting-edges extending from periphery to center-point of tool. E E show where portions of the periphery of the tool are cut away to give freedom and avoid friction.

This tool is constructed of any desired size and form and mold from a solid piece of steel, by forming a disk having a molded or beveled face of the form desired. I then remove, by the use of burr and file, portions of the two opposite sides of the disk from the periphery to the center through from the center-point to the shank, as shown at C, leaving the remaining portions or lips attached to shank B. This gives to the remaining portions or lips of the disk double counter-faced cutting-edges from the center-point outwardly and upwardly to the periphery of the disk or cutter, as shown at D $d$ D $d$, &c. This cutter is attached to a chuck by a set-screw. Said chuck is so arranged with double driving-belts and change-lever that it can be given right or left motion at the will of the operator.

A carving-tool thus constructed and attached has the power to penetrate and then cut laterally upon the surface when revolving to the right or left as the lumber is moved along past it.

The object of the counter-faced cutting-edges and reversible motion is to enable the operator at all times to do the cutting with the grain of the lumber, thereby securing a smoother cut than with only one motion and one set of cutting-edges, which can be done with no other single device known to me.

Claim.

What I claim as my invention is—

The within-described carving and molding tool, as shown and set forth.

MYRON T. BOULT.

Witnesses:
A. A. ELLSWORTH,
J. M. S. NEAL.